United States Patent [19]

Brendgens

[11] 4,141,523
[45] Feb. 27, 1979

[54] PROJECTOR HAVING AN ADJUSTABLE HEIGHT

[75] Inventor: Lothar Brendgens, Offenbach am Main, Fed. Rep. of Germany

[73] Assignee: Rollei-Werke Franke & Heidecke, Brunswick, Fed. Rep. of Germany

[21] Appl. No.: 814,495

[22] Filed: Jul. 11, 1977

[30] Foreign Application Priority Data

Aug. 25, 1976 [DE] Fed. Rep. of Germany ....... 7626538

[51] Int. Cl.² ............................................. F16F 15/00
[52] U.S. Cl. .................................. 248/653; 248/188.2; 353/119
[58] Field of Search ..................... 99/424, 444; 220/69; 224/46 R; 248/11, 13, 23, 188.2, 188.6, 184, 359; 352/242, 243; 353/119; 312/20

[56] References Cited

U.S. PATENT DOCUMENTS

| 1,991,493 | 2/1935 | Cornelius ................................ 248/11 |
| 2,313,663 | 3/1943 | Morgan et al. ......................... 248/11 |
| 2,809,553 | 10/1957 | Van Den Broek ..................... 248/11 |
| 3,016,793 | 1/1962 | Armbruster ....................... 248/11 X |
| 3,148,583 | 9/1964 | Maiershofer ...................... 248/11 X |
| 3,155,362 | 11/1964 | McCall ............................... 248/11 X |
| 3,251,568 | 5/1966 | Moe et al. ............................... 248/11 |
| 3,396,927 | 8/1968 | Masters ............................ 248/188.2 |
| 3,635,432 | 1/1972 | Hollander ........................ 248/188.6 |

FOREIGN PATENT DOCUMENTS

| 1218858 | 12/1959 | France ..................................... 353/119 |
| 1405808 | 4/1963 | France ..................................... 352/242 |

*Primary Examiner*—Lawrence J. Staab
*Attorney, Agent, or Firm*—Ernest F. Marmorek

[57] ABSTRACT

A projector adjustable in height includes a housing formed with a longitudinal slit at one side thereof, which slit is transverse to the axis of projection of the projector, a handle which has an axis of rotation transverse to the projection axis and to the slit, and which penetrates the housing at least partially. The handle projects from the lower portion of the housing through the slit, and may be pivoted about a point within the housing to a selected position in a direction transverse to the direction of the axle, as well as be rotated about the axis. A clamping device is substantially disposed about the housing point for clamping the handle at a selected position.

10 Claims, 9 Drawing Figures

FIG. 6
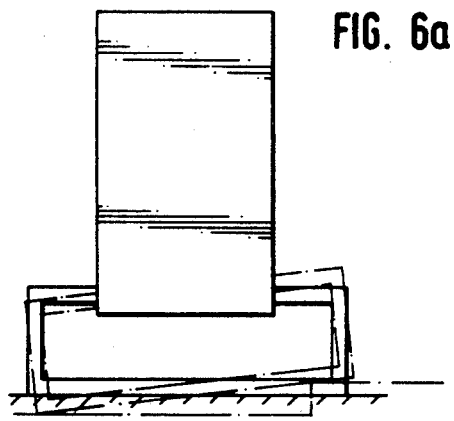
FIG. 6a
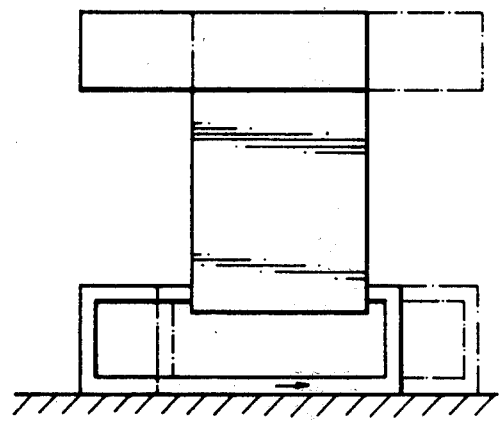
FIG. 6b
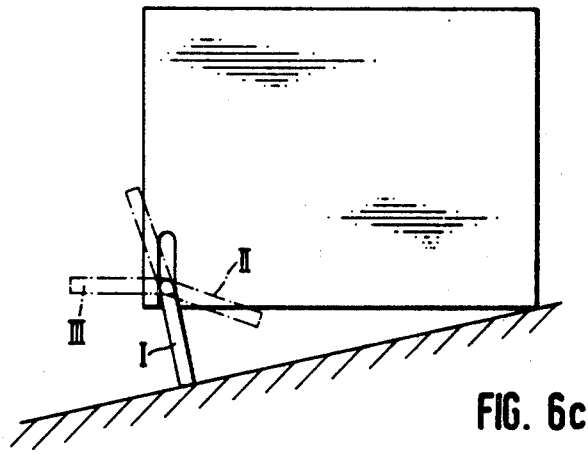
FIG. 6c

PROJECTOR HAVING AN ADJUSTABLE HEIGHT

BACKGROUND OF THE INVENTION

The invention relates to a projector having a device for adjusting its height, the height-adjusting device permitting a change in the angle of projection of a projector disposed on a flat surface, so as to align the vertical magnification of the projected image exactly on a fixed screen.

A known adjustment device is formed by a pin projecting from the underside of the projector, the projecting length of which may be arbitrarily adjusted. The projector is then disposed on its base, using as supports its rear edge, or two feet attached thereto, and the pin disposed and emerging near the front edge on the projector's lower side. A clamping device ensures that the adjustable length of the pin is maintained. Dependent on the adjustable length of this pin, the projection axis subtends a large or small angle of inclination with the base, so that the projected image on the screen may be vertically displaced.

An adjustment device of this type, in addition to resulting in a relatively unstable position of the projector, when the pin is extended to its maximum adjustable length, is disadvantageous primarily because the base of the projector must be completely horizontal. An angle of inclination of the base deviating from the horizontal cannot be equalized with the height adjustment device, so that in such a case vertical edges of the projected image can only be obtained by a change of the base plane.

SUMMARY OF THE INVENTION

It is therefore an object of the present invention to devise an adjustment mechanism for a projector, which permits not only a stable positioning of the projector in all adjustable positions, but also permits equalization of any deviation of the base from the horizontal.

The projector accordingly has an axis of projection, is adjustable in height, and includes a housing which has a lower portion, and is formed with a longitudinal slit being transverse to the projection, a handle which has an axle or rotation transverse to the projection axis and to the slit, and which passes through the housing partially, the handle projecting from the lower portion of the housing through the slit. The handle may be pivoted about a point within the housing to a selected position in the direction transverse to the direction of the axis, and may be rotated about the axis; a clamping device substantially disposed about the housing point permits clamping of the handle at this selected position. By pivoting the handle about its longitudinal axis, which passes through the housing, the distance of the underside of the projector from the base can be varied, while any deviation of the base from the horizontal can be equalized; the projector then remains horizontal by pivoting of the handle in a direction substantially perpendicular to the axis of the handle.

In a further refinement, the handle has substantially a contour in the shape of a rectangle, and the axle of rotation coincides substantially with a longitudinal side of the rectangle. This permits the use of the handle to carry the projector. It is merely necessary, therefore, to pivot the handle by 90° around the front side of the projector from its position adjusted for maximal height, and to clamp it in that position.

It is preferable if the handle may be at least displaced partially at the pivoting point along the axle. This permits a further adjustment of the handle with respect to the base on which the projector stands; additionally, any turning moments due to any unsymmetrical load of the projector may thus be avoided.

In a further refinement, the clamping means include a clamping block which may be opened and closed, and which embraces the handle, and a chuck disposed external to the housing for opening and closing the clamping block.

A first embodiment of this clamping device includes a clamping block in the shape of a cylinder, which is formed with a longitudinal recess disposed transverse to the axis of the cylinder, and which separates the clamping block into two clamping jaws. The clamping block is additionally formed with an opening in the interior of the cylinder, which opening communicates with a recess; a clamping screw including a screw shaft which passes through the clamping jaws, and has an axis parallel to the cylinder axis. A screw head abuts one of the clamping jaws, and the housing is formed with a bore on the other side thereof for receiving the screw shaft. The shaft passes through the bore, and a tightening nut may be screwed onto the shaft, and upon being screwed thereonto, abuts the other side of the housing.

In a second embodiment of the clamping device, the housing is formed with a second bore on the other side thereof and has a wall; the clamping block then includes a bolt which has an axis and passes through the second bore, and is additionally formed with a third bore transverse to the bolt axis for receiving the handle with a predetermined amount of play. A cylindrical ring is displaceably disposed on the bolt substantially between the housing wall and the third bore, and is formed with a recess on one of its end portions corresponding to the third bore; an axial displacement device for the bolt is disposed on an end of the bolt emerging from the housing, the axial displacement device abutting the housing on an external side thereof.

The bolt is preferably formed with a groove at one end thereof, and a lever is pivotally supported on the other side of the housing, has pivot pins disposed diammetrically opposite one another to engage the groove and has preferably an eccentrically-formed portion on one end thereof, which is adapted to abut the housing wall.

The other side of the housing is formed with a second recess, and the lever may be pivoted so as to fit snugly thereinto when the handle is clamped in a selected position.

The second recess is preferably longitudinal and transverse to the projection axis.

The projector is primarily intended for use with still pictures.

BRIEF DESCRIPTION OF THE DRAWING

For a fuller understanding of the nature and objects of the invention, reference should be had to the following detailed description, taken in connection with the accompanying drawings, in which:

FIG. 6 is a schematic view of the various adjustment positions of the handle.

DESCRIPTION OF THE PREFERRED EMBODIMENTS.

Figure 1:
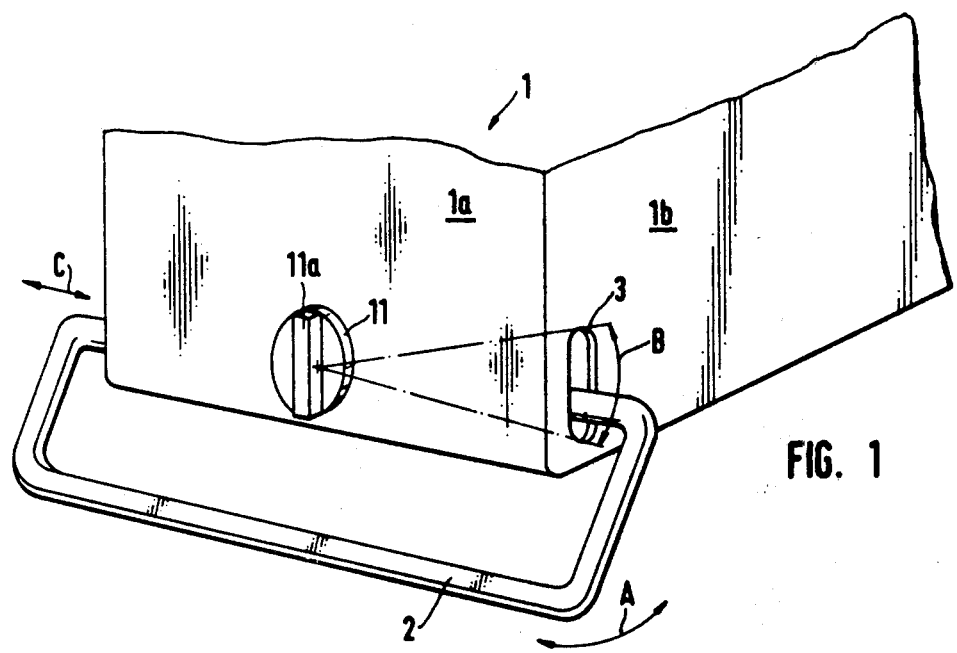
FIG. 1 shows a partial view of the projector having the inventive height adjustment device, and a first embodiment of the clamping device for the handle.

A housing of a projector 1 has a front wall 1a and a side wall 1b, as shown in FIG. 1. The front wall or side 1a of the projector is fitted with a non-illustrated projection lens, and a clamping device to be described later. The handle 2 serving for a change of the angle of inclination of the projection axis with respect to the base of the projector is formed in the shape of a reactangle, one longitudinal side of the rectangle passing through the projector housing 1 and emerging from respective vertical slits from each of the walls or sides of the projector. One vertical slit 3 is shown in FIG. 1 on the side of the housing 1b.

The handle 2 is pivotable about its longitudinal axis, as well as about a point within the interior of the projector, (see arrow A in FIG. 1); the handle 2 may occupy any arbitrary position as shown in FIG. 6c. In the position 1, the projection axis subtends a maximum angle with respect to the base of the projector, in position 2 it has the smallest angle of inclination, and in position 3 the handle may be used for carrying the projector.

The handle is furthermore adjustable vertically with respect to its axis, as shown by the arrow B in FIG. 1, or by FIG. 6a. This permits equalization of any horizontal unevenness of the projector's base, when the projector is horizontal. Furthermore, the handle may be displaced through its supporting point along its longitudinal axis, as is shown by the arrow C in FIG. 1, or as is shown in FIG. 6a.

In order to pivot the handle into all the positions previously described, and also in order to maintain it in any desired position, a clamping device has been provided, which is disposed within the projector, namely on the inner front wall of the housing 1a.

Figure 2:
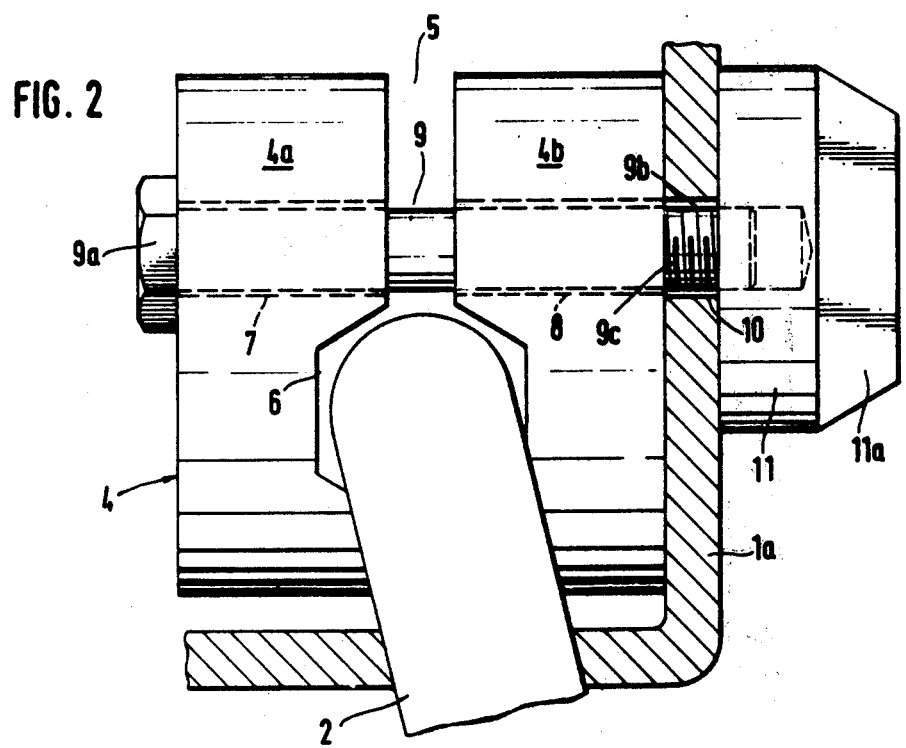
FIG. 2 shows a longitudinal section through the projector and the clamping device of FIG. 1.

This clamping device, as shown in FIGS. 1 and 2, consists of a clamping block 4, which is cylindrical in shape, and which abuts with a front portion thereof the inner front wall of the housing 1a. The cylinder is formed with a longitudinal recess 5 having a direction transverse to the cylinder axis, and which separates the clamping device 4 into two clamping jaws 4a and 4b, the recess 5 communicating with an enlarged bore 6 in the interior of the clamping block. Each of the clamping jaws is formed wtih bores 7 or 8, respectively, which bores are aligned with each other, and are parallel to the axis of the cylinder. A clamping screw 9 passes through bores 7 and 8 and has a head 9a, which abuts the clamping jaw 4a; the end of the shaft 9b of the clamping screw 9 passes through a bore 10 in the housing wall 1a, the shaft end 9b having a thread 9c. A tightening nut 11 disposed on the external side of the housing wall may be screwed onto the shaft end 9b. The handle 2 is disposed in the bore 6 of the clamping jaw 4, and has a predetermined play in the released position of the clamping device. In this position, the handle may be pivoted, rotated or displaced to the desired position, the pivoting along the direction of the arrow B in FIG. 1 being limited by the length of the vertical slit. In order to clamp the handle into the desired position, the tightening nut 1, which, as shown in FIG. 1, is formed with a gripping surface 11a, should be turned in a clockwise direction. The clamping screw 9 is therefore screwed into the tightening nut 11, the tightening jaw 4b and the tightening jaw 4a are pressed to the inner front wall 1a of the housing, and the clamping jaw 4b, respectively, so that the bore 6 is narrowed and clamps the handle 2.

Figure 3:
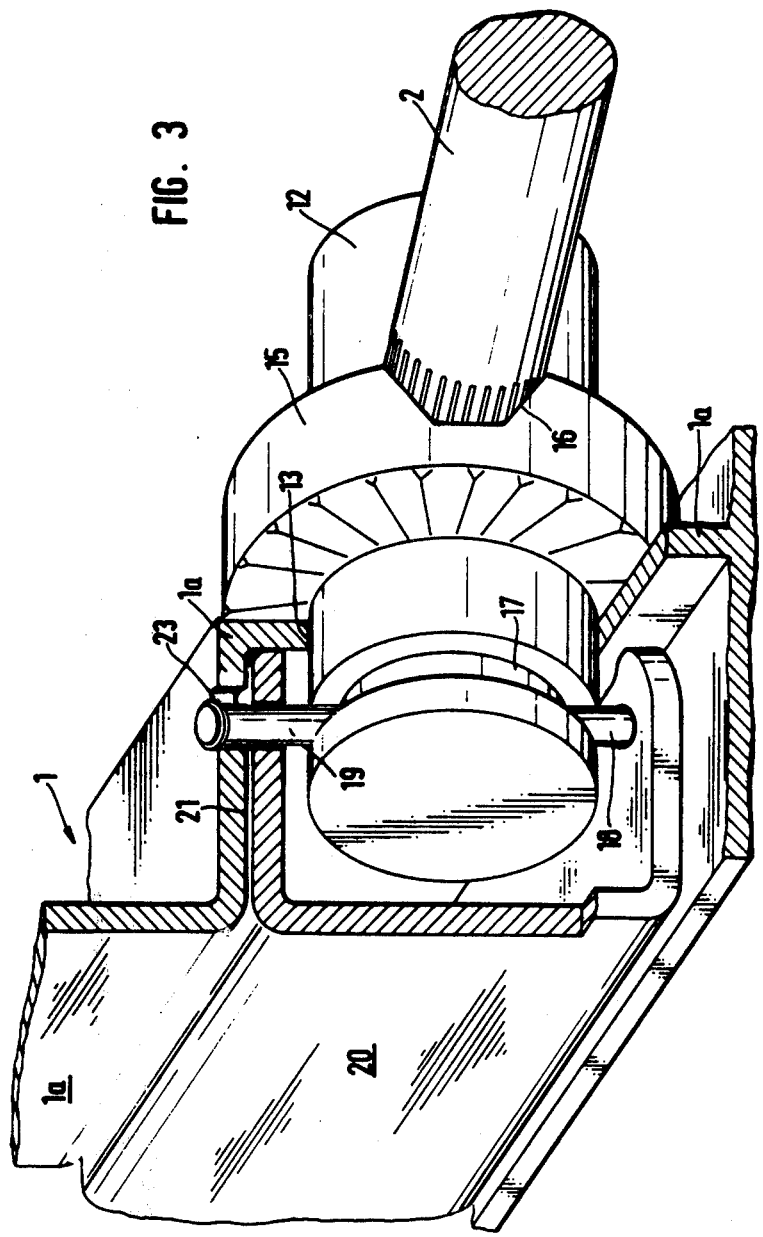
FIG. 3 shows a partial perspective view of the projector, and a second embodiment of the clamping device for the handle.
Figure 4:
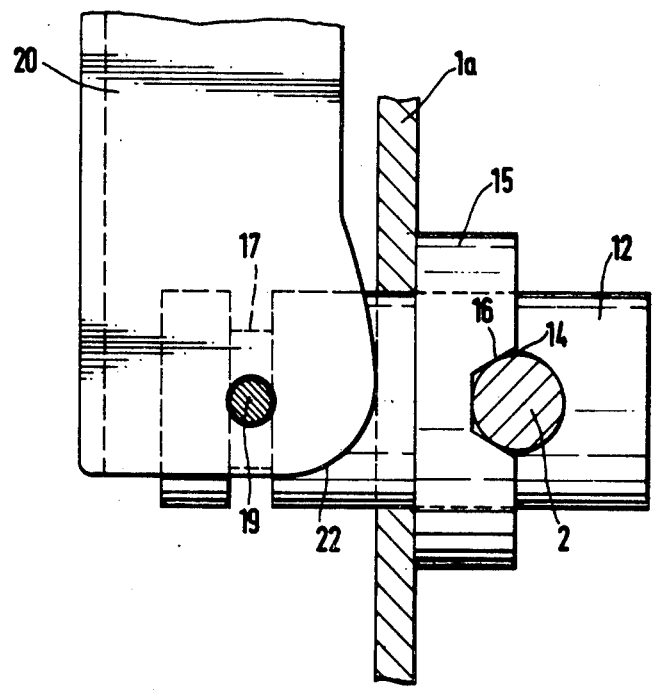
FIG. 4 is a partial plan view of the clamping device according to FIG. 3, the handle being clamped.
Figure 5:
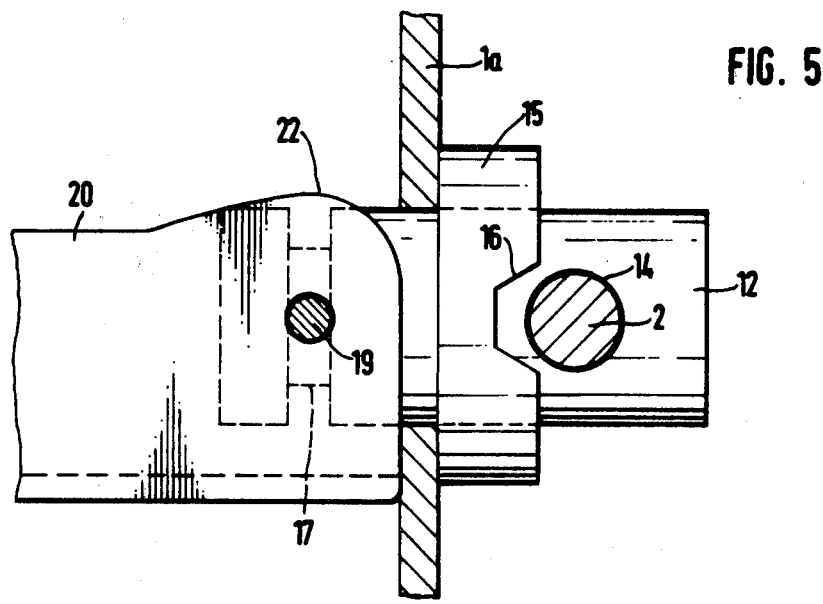
FIG. 5 corresponds to FIG. 4, showing the handle in a released state.

In the embodiment example according to FIGS. 3 to 5, the clamping device consists of a bolt 12, which passes through a bore 13 into the front wall of the housing. The bolt 12 is formed with a bore 14 transverse to its axis, the handle 2 being disposed therein with a predetermined amount of play. A displaceable cylinder ring 15 is disposed between the bore 14 or the handle 2 on one hand, and the housing wall 1a on the other hand, which ring is formed with a recess 16 corresponding to the bore 14 on a surface thereof facing away from the housing bore. The end portion of the cylinder passing through the wall of the housing 1a is formed with an annular groove 17, into which there engage supporting beams 18 and 19 of a rotatably supported lever 20 in a locking fashion, with the lever 20 being rotatably disposed in the front wall of the housing. The axis of rotation of the lever 20 is disposed vertically. The wall of the housing, as shown in FIG. 3, is formed with a U-shaped recess 21, into which the lever 20 may be slid, so that it fits snugly thereinto. The supporting pins 18 and 19 are held within guide bores 23 of the U-shaped recess 21, so that a vertical position of the lever on the front wall 1a of the housing can be realized in an easy fasion. The end of the lever 20 is formed with an eccentric portion 22, which points towards the U-shaped recess 21. The eccentric portion 22, as shown in FIGS. 4 and 5, is formed in such a manner that it permits maximum withdrawal of the bolt end from the bore of the housing 13 in the position of the lever 20 shown in FIG. 3, in which latter position it is disposed flush with the front side 1a of the projector housing, while in a position of the lever 20 pivoted therefrom by 90°, the lever 20 then pointing in the direction of the projection axis (see FIG. 5), the length of the bolt projecting from the housing wall is minimal. In the latter case the cylinder ring 15 and the recess 16 formed therein is displaced from the handle 2, and the handle can be rotated, pivoted or displaced to the desired position. As soon as the lever 20 is placed into the basic position shown in FIG. 3, the eccentric portion 22, as shown in FIG. 4, causes the bolt 12 to advance through the bore in the housing front wall 1a, until the handle 2 is pressed against the recess 16 of the ring 15 abutting against the inner housing front wall 1a. The handle 2 is then maintained rigidly in that position.

Both embodiments of the clamping device shown respectively in FIGS. 1 and 2 on one hand, and FIGS. 3 and 5 on the other hand, permit a rapid release and clamping of the handle, which is very advantageous in minimizing the set-up time of the projector.

Having thus described the invention, what I claim as new and desire to be secured by Letters Patent, is as follows:

1. A projector having an axis of projection and being adjustable in height,
  comprising in combination:
    a housing having a base, said base being formed with a longitudinal slit at an angle to the projection axis at least on one side of said base, ground engaging means for adjusting the position of said base relative to the ground and being pivotable to a multiplicity of selected positions about at least one axis at an angle to the projection axis and to said slit, said ground engaging means projecting from said base and including a portion extending through said slit into said housing, and clamping means operable for clamping said ground engaging means in any of said selected positions.

2. A projector according to claim 1 wherein said ground engaging means has substantially a contour in the shape of a rectangle, the pivoting axis substantially coinciding with a longitudinal side of said rectangle.

3. A projector according to claim 1 wherein said ground engaging means is displaceable substantially along the pivoting axis.

4. A projector according to claim 1, wherein said clamping means further comprise an openable and closable clamping block embracing said ground engaging means, and chuck means disposed external to said housing for opening and closing said clamping block.

5. A projector according to claim 4 wherein said clamping block has the shape of a cylinder having a longitudinal recess disposed at an angle to the axis of the cylinder and separating said clamping block into two clamping jaws, said cylinder having an opening in the interior thereof communicating with said recess, and further comprising a clamping screw including a screw shaft, passing through said clamping jaws, having an axis parallel to the cylinder axis, and a head abutting one of said clamping jaws, said housing having a bore on the front side for receiving said screw shaft, said screw shaft passing through said bore, and a tightening nut screwable onto said shaft, and upon being screwed thereon, abutting said other side of said housing.

6. A projector according to claim 5 wherein said housing has a second bore on the front side, and includes a wall, and wherein said clamping block includes a bolt having an axis and passing through said first bore, and has a third bore transverse to the bolt axis for receiving said ground engaging means with a predetermined amount of play, and further comprising a cylinder ring having an end portion, and being displaceably disposed on said bolt substantially between the housing wall and said third bore, said end portion having a recess corresponding to said third bore, and axial displacement means for said bolt disposed on an end of said bolt emerging from said housing, said axial displacement means abutting the housing on an external side thereof.

7. A projector according to claim 6 wherein said bolt has a groove at one end thereof, and further comprising a lever pivotably supported on said front end of said housing, having pivot pins disposed diametrically opposite one another engaging said groove, and having an eccentrically formed portion on one end thereof, for permitting said eccentrically formed portion to abut the housing wall.

8. A projector according to claim 7 wherein said other side of said housing has a second recess, said lever being pivotable snugly thereinto upon said ground engaging means being clamped at the selected position.

9. A projector according to claim 8, wherein said second recess is longitudinal and disposed at an angle to the projection axis.

10. A projector having an axis of projection and being adjustable in height, comprising in combination:

a housing having a base, said base being formed with a longitudinal slit at an angle to the projection axis at least on one side of said base, ground engaging means for adjusting the position of said base relative to the ground, and being pivotable to a plurality of selected positions about at least one axis at an angle to the projector axis and to said slit, said ground engaging means projecting from said base and including a portion extending through said slit into said housing, and being pivotable about a second axis at an angle to said at least one axis, thereby enabling the portion of the ground engaging means extending through said slit to move within said slit, and clamping means operable for clamping and ground engaging means in any of said selected positions.

* * * * *